United States Patent
Oh et al.

(10) Patent No.: US 8,912,832 B2
(45) Date of Patent: Dec. 16, 2014

(54) SIGNAL TRANSMISSION/RECEPTION SYSTEM

(75) Inventors: Sang-Mook Oh, Icheon-si (KR); Tae-Sik Yun, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 13/619,632

(22) Filed: Sep. 14, 2012

(65) Prior Publication Data

US 2013/0162315 A1    Jun. 27, 2013

(30) Foreign Application Priority Data

Dec. 22, 2011  (KR) .................. 10-2011-0140463

(51) Int. Cl.
 *H03K 5/01*   (2006.01)
(52) U.S. Cl.
 USPC .......................................... 327/165; 327/291
(58) Field of Classification Search
 None
 See application file for complete search history.

(56) References Cited

U.S. PATENT DOCUMENTS

| | | | | |
|---|---|---|---|---|
| 3,611,361 | A * | 10/1971 | Gallichotte et al. | 340/505 |
| 6,496,424 | B2 * | 12/2002 | Ma et al. | 365/189.16 |
| 2010/0307798 | A1 * | 12/2010 | Izadian | 174/255 |
| 2010/0315886 | A1 * | 12/2010 | Tanaka | 365/189.02 |

* cited by examiner

*Primary Examiner* — Cassandra Cox
(74) *Attorney, Agent, or Firm* — IP & T Group LLP

(57) ABSTRACT

A signal transmission/reception system includes a transmission line, a signal transmission circuit configured to generate a transfer signal and transfer the transfer signal through the transmission line, wherein a logic value of the transfer signal is changed whenever a pulse signal is input to the signal transmission circuit, and a signal reception circuit configured to receive the transfer signal through the transmission line and generate a restoration signal using the transfer signal and a delayed transfer signal obtained by delaying the transfer signal.

13 Claims, 2 Drawing Sheets

SIGNAL TRANSMISSION/RECEPTION SYSTEM

CROSS-REFERENCE TO RELATED APPLICATIONS

The present application claims priority of Korean Patent Application No. 10-2011-0140463, filed on Dec. 22, 2011, which is incorporated herein by reference in its entirety.

BACKGROUND

1. Field

Exemplary embodiments of the present invention relate to a signal transmission/reception system.

2. Description of the Related Art

A plurality of circuits included in a semiconductor integrated circuit operates by exchanging signals with one another. These signals are transferred through transmission lines through which the plurality of circuits are electrically connected to one another. The transmission lines include metal lines and the like, and delay occurs in signals transferred through the transmission lines due to the resistance and capacitance of the transmission lines. In general, delay occurring due to resistance and capacitance is called an "RC delay." The RC delay is increased as the resistance and capacitance of the transmission line is increased.

Meanwhile, packaging technology for a semiconductor integrated apparatus is being continuously advanced to keep up with requirements for miniaturization and high capacity. Thus, various technologies for manufacturing a stacked semiconductor apparatus capable of satisfying mounting efficiency as well as miniaturization and high capacity have been developed.

The stacked semiconductor apparatus can be fabricated using a method, in which individual semiconductor chips having different functions are stacked upon one another and the stacked chips are packaged at one time, or a method in which individually packaged semiconductor chips are stacked upon one another. In the stacked semiconductor apparatus, the individual semiconductor chips are electrically connected to one another through metal wires, through-silicon vias (TSVs) and the like.

Recently, a stacked semiconductor apparatus using through-silicon vias (TSVs) has been mainly fabricated. The stacked semiconductor apparatus using the through-silicon vias (TSVs) is fabricated by forming via holes through semiconductor chips, forming through electrodes (through-silicon vias, "TSVs") by filling the via holes with conductive materials, and electrically connecting upper semiconductor chips to lower semiconductor chips through the through electrodes. The through-silicon via serves as a transmission line for transferring signals or power to each element of the stacked semiconductor apparatus.

However, the through-silicon via has high resistance and capacitance as compared with a metal line used as a transmission line. Therefore, RC delay is increased, resulting in the deterioration of signal transfer characteristics.

FIG. 1 is a diagram illustrating features occurring due to RC delay present in a transmission line.

A first signal S1 is input to a transmission line 101 through an input terminal IN of the transmission line 101, and a second signal S2 is output from the transmission line 101 through an output terminal OUT of the transmission line 101. A driver 102 drives the second signal S2 and transfers the second signal S2 to each element of a semiconductor integrated circuit. The second signal S2 is a signal modified from the first signal S1 due to an RC delay occurring in the transmission line 101. A third signal S3 is transferred to each element of the semiconductor integrated circuit by the driver 102.

Hereinafter, a description will be provided for the case in which the first signal S1 is a signal toggled at a regular interval.

The first signal S1 is changed to the second signal S2 by passing through the transmission line 101. The second signal S2 is transferred to each element of the semiconductor integrated circuit through the driver 102. For purposes of illustration, it is assumed that the driver 102 outputs 'High' when a level of the second signal S2 is higher than logic threshold T, and outputs 'Low' when the level of the second signal S2 is lower than the logic threshold T.

When an RC delay does not occur in the transmission line 101, the second signal S2 and the third signal S3 have substantially the same waveform as that of the first signal S1, except that the second signal S2 and the third signal S3 have a delayed phase as compared with the first signal S1. However, when the RC delay does occur in the transmission line 101 and the second signal S2 is modified as illustrated in FIG. 2, since the level of the second signal S2 does not exceed the logic threshold T of the driver 102, the third signal S3 has a waveform different from that of the first signal S1. Thus, a signal may not be normally transmitted due to the resistance and capacitance of the transmission line 101.

When the signal is not normally transmitted to each element of the semiconductor integrated circuit, an error may occur in the operation of the semiconductor integrated circuit. This feature becomes more pronounced as a toggle cycle of the first signal S1 becomes short (that is as an operation frequency is high). Since the transmission line 101 having capacitance is frequently charged/discharged as the toggle cycle becomes short, current consumption is also increased, where an increase in a voltage level of a signal loaded on the transmission line 101 means that the transmission line 101 is charged and a decrease in the voltage level of the signal loaded on the transmission line 101 means that the transmission line 101 is discharged.

SUMMARY

An embodiment of the present invention is directed to a signal transmission/reception system capable of substantially preventing a signal transmitted through a transmission line from being modified due to an RC delay and an erroneous signal different from the original signal from being transmitted by using the signal transmitted through the transmission line and a delayed signal obtained by delaying the signal.

In accordance with an embodiment of the present invention, a signal transmission/reception system includes: a transmission line; a signal transmission circuit configured to generate a transfer signal and transfer the transfer signal through the transmission line, wherein a logic value of the transfer signal is changed whenever a pulse signal is input to the signal transmission circuit; and a signal reception circuit configured to receive the transfer signal through the transmission line and generate a restoration signal using the transfer signal and a delayed transfer signal obtained by delaying the transfer signal.

In accordance with another embodiment of the present invention, a signal transmission/reception method includes: generating a transfer signal having a logic value changed in response to a pulse signal; transferring the transfer signal through a transmission line; and generating a restoration signal in response to the transfer signal.

The signal transmission/reception system in accordance with the present invention modifies and transmits a signal to be transmitted through a transmission line, and restores an original signal, which is to be transmitted through the transmission line, by using the signal transmitted through the transmission line and a delayed signal obtained by delaying the signal, thereby substantially preventing an erroneous signal from being transmitted due to an RC delay occurring in the transmission line.

Furthermore, the signal transmission/reception system in accordance with the present invention reduces the frequency of a transmission signal to be transmitted through the transmission line, and transmits the transmission signal, thereby reducing a frequency by which the transmission line is charged/discharged during the transmission of the signal, resulting in the reduction of current consumption of a semiconductor integrated circuit.

DETAILED DESCRIPTION

Figure 1:
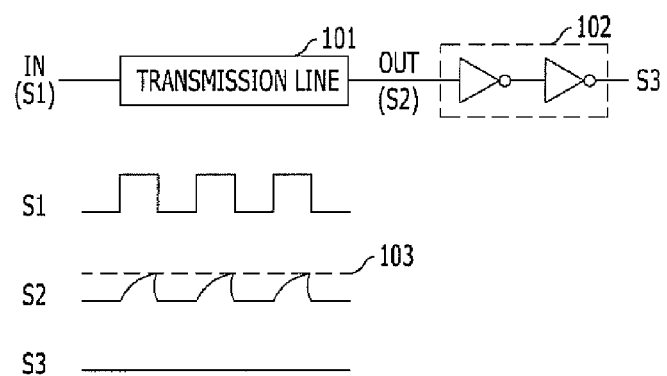
FIG. 1 is a diagram illustrating features occurring due to RC delay present in a transmission line.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
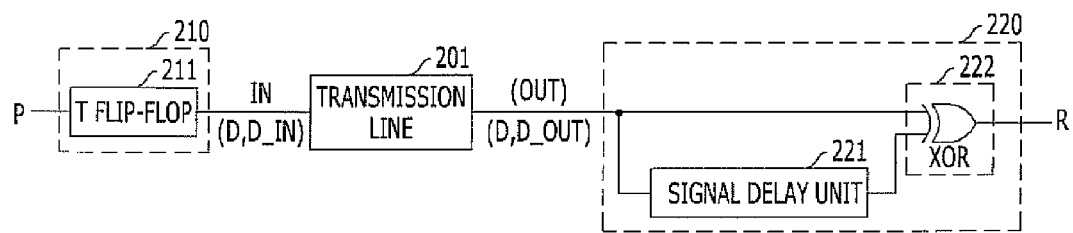
FIG. 2 is a configuration diagram of a signal transmission/reception system in accordance with an embodiment of the present invention.
Figure 3:
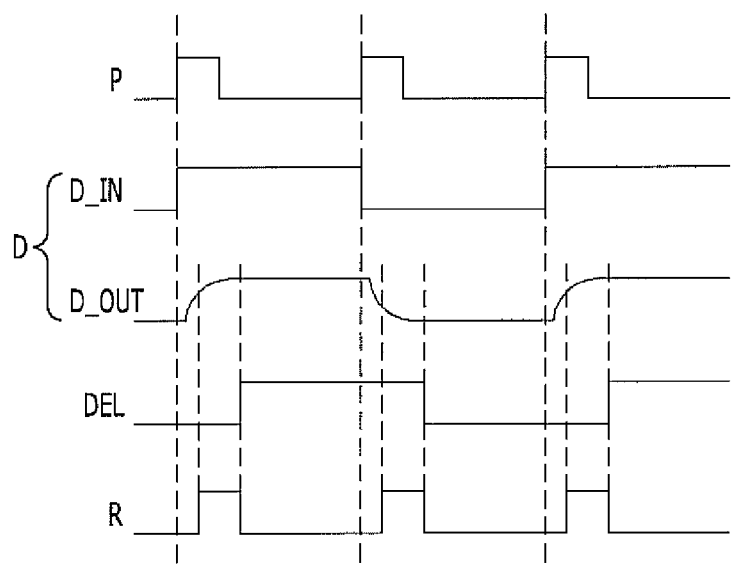
FIG. 3 is a waveform diagram illustrating an operation of a signal transmission/reception system of FIG. 2.

FIG. 2 is a configuration diagram of a signal transmission/reception system in accordance with an embodiment of the present invention, and FIG. 3 is a waveform diagram illustrating the operation of the signal transmission/reception system of FIG. 2.

Referring to FIG. 2, the signal transmission/reception system includes a transmission line 201, a signal transmission circuit 210, and a signal reception circuit 220. The signal transmission circuit 210 is configured to generate a transfer signal D and transfer the transfer signal D through the transmission line 201, wherein a logic value of the transfer signal D is changed whenever a pulse signal P is applied. The signal reception circuit 220 is configured to receive the transfer signal D through the transmission line 201 and generate a restoration signal R using the transfer signal D and a delayed transfer signal DEL obtained by delaying the transfer signal D.

The transmission line 201 may include a metal line or a through-silicon via. However, the present invention is not limited thereto. For example, the transmission line 201 may include any configuration capable of transferring an electrical signal. The transmission line 201 may be a configuration for transmitting a signal in one semiconductor integrated circuit chip, or a configuration for transmitting a signal between semiconductor integrated circuit chips different from each other. The signal transmission circuit 210 and the signal reception circuit 220 may be included in one semiconductor integrated circuit chip, or may be included in different semiconductor integrated circuit chips, respectively.

Hereinafter, the operation of the signal transmission/reception system will be described with reference to FIG. 2 and FIG. 3.

The signal transmission circuit 210 generates the transfer signal D and transfers the transfer signal D through the transmission line 201, wherein the logic value of the transfer signal D is changed (that is, the transfer signal D is toggled whenever the pulse signal P is applied) whenever the pulse signal P to be transmitted through the transmission line 201 is applied. For this operation, the signal transmission circuit 210 may include a T flip-flop 211 configured to change the logic value of the transfer signal D in response to the pulse signal P. The T flip-flop 211 changes a logic value of an output signal whenever a logic value of an input signal is 'High'. According to another example, the signal transmission circuit 210 may also be any reasonably suitable signal transmission circuit, different from a T flip-flop, that generates a signal having a logic value being changed whenever the pulse signal P is applied.

The transfer signal D generated by the signal transmission circuit 210 is transferred to the signal reception circuit 220 through the transmission line 201. At this time, an RC delay occurs due to resistance and capacitance present in the transmission line 201. Therefore, a waveform of the transfer signal D at the input terminal IN of the transmission line is different from a waveform of the transfer signal D at the output terminal OUT of the transmission line. In FIG. 3, 'D_IN' indicates the waveform of the transfer signal D at the input terminal IN of the transmission line, and 'D_OUT' indicates the waveform of the transfer signal D at the output terminal OUT of the transmission line.

The signal reception circuit 220 generates the restoration signal R using the transfer signal D through the transmission line 201 and the delayed transfer signal DEL obtained by delaying the transfer signal D. The signal reception circuit 220 activates the restoration signal R in the period in which the logic value of the transfer signal D is different from a logic value of the delayed transfer signal DEL. The restoration signal R may be a signal having substantially the same waveform as that of a signal obtained by delaying the pulse signal P (that is, an activation period of the restoration signal R may have a size corresponding to or a size substantially equal to an activation period of the pulse signal P).

For this operation, the signal reception circuit 220 includes a signal delay section 221 and a signal generation section 222. The signal delay section 221 is configured to delay the transfer signal D input thereto and generate the delayed transfer signal DEL, and the signal generation section 222 is configured to generate the restoration signal R in response to the transfer signal D and the delayed transfer signal DEL. Here, a delay value, by which the signal delay section 221 delays the transfer signal D, corresponds to the activation period of the pulse signal P. This is because the difference between the phase of the transfer signal D and the phase of the delayed transfer signal DEL corresponds to the activation period of the restoration signal R. The signal generation section 222 generates the restoration signal R, which is activated in the period in which the logic value of the transfer signal ID is different from the logic value of the delayed transfer signal DEL. The restoration signal R has an activation period corresponding to the difference between the phase of the transfer signal D and the phase of the delayed transfer signal DEL. For this operation, the signal generation section 222 may include an exclusive OR gate (XOR) configured to receive the transfer signal D and the delayed transfer signal DEL from the signal delay unit 221 and output the restoration signal R. The exclusive OR gate outputs 'Low' in the period that the logic value of the transfer signal D is substantially equal to the logic value of the delayed transfer signal DEL and outputs 'High' in the period that the logic value of the transfer signal D is different from the logic value of the delayed transfer signal DEL, thereby generating the restoration signal R. The configuration of the signal generation section 222 is not limited to the exclusive OR gate. The fact that the delay value of the signal delay section 221 corresponds to the activation period of the pulse signal P represents that the difference between the phase of the transfer signal D and the phase of the delayed transfer signal DEL delayed by the signal delay section 221 is substantially equal to the activation period of the pulse signal P.

Hereinafter, the entire operation of the signal transmission/reception system will be described with reference to FIG. 3.

The signal transmission circuit 210 receives the pulse signal P, generates the transfer signal D in order to transmit the pulse signal P without loss, and transfers the transfer signal D to the transmission line 201. The transfer signal D has a waveform of 'D_IN' at the input terminal IN of the transmission line and has a waveform of 'D_OUT' at the output terminal OUT of the transmission line. The signal reception circuit 220 receives the transfer signal (D, has a waveform of 'D_OUT') from the transmission line 201, generates the delayed transfer signal DEL, and generates the restoration signal R, which is activated in the period that the logic value of the transfer signal D is different from the logic value of the delayed transfer signal DEL. The generated restoration signal R has substantially the same waveform as that of a signal obtained by delaying the phase of the pulse signal P.

The signal transmission/reception system in accordance with the present invention may be a system configured to transmit/receive a command included in a semiconductor memory. In this case, the pulse signal P may be a command, and when the command has been in transmitted to another circuit in the same semiconductor memory chip through a transmission line or has been transmitted to another semiconductor memory chip, the command may be called a "restoration signal R." The command may include an active command, a read command, a write command, a refresh command, and the like.

In the conventional art, since a pulse width of a pulse signal to be transmitted is small, when the time for which the pulse signal substantially maintains a specific logic value is short, the logic value of the pulse signal is changed before a logic value of a signal output from a transmission line is changed due to an RC delay, resulting in the occurrence of the above-mentioned features. However, according to the present invention, a signal having a logic value changed in response to a pulse signal to be transmitted is generated, and information on the time point at which the pulse signal is applied is transmitted, and the pulse signal is restored at the output terminal of the transmission line based on the information, so that a signal may be transmitted without an error even when the pulse width of the pulse signal to be transmitted is small.

Referring to the waveform diagram of FIG. 3, the logic value of the transfer signal D is not frequently changed as compared with the pulse signal P. Since a change in the logic value of a signal on a transmission line means that the transmission line is charged or discharged, when the logic value of the signal on the transmission line is not frequently changed, the transmission line is not frequently charged or discharged, resulting in the reduction of current consumption.

Figure 4:
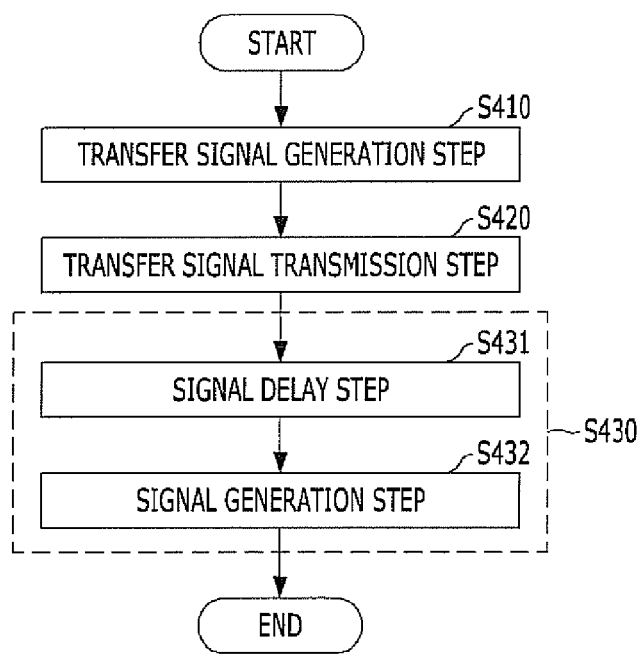
FIG. 4 is a flowchart illustrating a signal transmission/reception method in accordance with an embodiment of the present invention.

FIG. 4 is a flowchart illustrating a signal transmission/reception method in accordance with an embodiment of the present invention.

Referring to FIG. 4, the signal transmission/reception method includes step S410 for generating a transfer signal, a logic value of which being changed in response to a pulse signal, step S420 for transferring the transfer signal through a transmission line, and step S430 for generating a restoration signal in response to the transfer signal.

Hereinafter, the signal transmission/reception method will be described with reference to FIG. 2 to FIG. 4.

The pulse signal P is transmitted through the transmission line 201 and converted to the transfer signal D (S410, hereinafter, referred to as a 'transfer signal generation step' S410). The reason for converting the pulse signal P to the transfer signal D is for improving the transfer performance of the pulse signal. In the 'transfer signal generation step' S410, the transfer signal D, a logic value of which is changed whenever the pulse signal P is applied, is generated, that is, the pulse signal P is converted to the transfer signal D to be easily transmitted through the transmission line 201. The transfer signal D is tolerant to a signal modification due to an RC delay because the period in which substantially the same logic value is maintained is long for the transfer signal D, as compared with the pulse signal P.

The transfer signal D generated in the 'transfer signal generation step' S410 is transmitted through the transmission line 201 (S420, hereinafter, referred to as a 'transfer signal transmission step' S420). The transfer signal D is input to the input terminal IN of the transmission line and is output to the output terminal OUT of the transmission line. At this time, the waveform of the transfer signal D is changed from the 'D_LIN' to the 'D_OUT' due to an RC delay. A description for the transmission line 201 is substantially the same as that in FIG. 2 and FIG. 3.

After the transfer signal D is output to the output terminal OUT of the transmission line, the transfer signal D is converted to the restoration signal R having substantially the same activation period as that of the pulse signal P (S430, hereinafter, referred to as a 'restoration signal generation step' S430). Since the transfer signal D has, for example, information on only the time point at which the pulse signal P is applied and has a waveform different from that of the pulse signal P, the restoration signal R having an activation period corresponding to the activation period of the pulse signal P (or an activation period substantially equal to the activation period of the pulse signal P) is generated using the transfer signal D. The restoration signal R has a waveform substantially equal to that of a signal obtained by delaying the pulse signal P.

For this operation, the 'restoration signal generation step' S430 includes a step S431 (hereinafter, referred to as a 'signal delay step' S431) in which the transfer signal D transferred through the transmission line 201 is delayed to generate the delayed transfer signal DEL, and a step S432 (hereinafter, referred to as a 'signal generation step' S432) in which the restoration signal R is generated in response to the transfer signal D and the delayed transfer signal DEL. In the 'signal delay step' S431, the transfer signal D is delayed by a delay value corresponding to the activation period of the pulse signal D, thereby generating the delayed transfer signal DEL. In the 'signal generation step' S432, the restoration signal R is activated in the period in which the logic value of the transfer signal D is different from a logic value of the delayed transfer signal DEL.

In the description of FIG. 2 and FIG. 3, the pulse signal P may be any reasonably suitable command of a semiconductor memory as described above.

The signal transmission/reception method in accordance with the present invention has features as described above.

What is claimed is:

1. A signal transmission/reception system comprising:
   a transmission line;
   a signal transmission circuit configured to generate a transfer signal and transfer the transfer signal through the transmission line, wherein a logic value of the transfer signal is changed whenever a pulse signal is input to the signal transmission circuit; and
   a signal reception circuit configured to receive the transfer signal through the transmission line and generate a restoration signal using the transfer signal and a delayed transfer signal obtained by delaying the transfer signal,
   wherein the signal reception circuit is configured to activate the restoration signal in a period that the logic value of the transfer signal is different from a logic value of the delayed transfer signal.

2. The signal transmission/reception system of claim 1, wherein the signal transmission circuit comprises:
   a T flip-flop configured to change the logic value of the transfer signal in response to the pulse signal.

3. The signal transmission/reception system of claim 1, wherein an activation period of the restoration signal has a duration substantially equal to an activation period of the pulse signal.

4. The signal transmission/reception system of claim 1, wherein the signal reception circuit comprises:
   a signal delay unit configured to delay the transfer signal and generate the delayed transfer signal; and
   a signal generation unit configured to generate the restoration signal in response to the transfer signal and the delayed transfer signal.

5. The signal transmission/reception system of claim 4, wherein a delay value of the signal delay unit is substantially equal to an activation period of the pulse signal.

6. The signal transmission/reception system of claim 1, wherein the transmission line includes a through-silicon via.

7. The signal transmission/reception system of claim 1, wherein the pulse signal includes one of a command, an address and data of a semiconductor memory.

8. A signal transmission/reception method comprising:
   generating a transfer signal having a logic value changed in response to a pulse signal;
   transferring the transfer signal through a transmission line; and
   generating a restoration signal in response to the transfer signal,
   wherein the generating of the restoration signal comprises:
      delaying the transfer signal transferred through the transmission line and generating a delayed transfer signal; and
      generating the restoration signal in response to the transfer signal and the delayed transfer signal.

9. The signal transmission/reception method of claim 8, wherein the restoration signal is activated in a period that the logic value of the transfer signal is different from a logic value of the delayed transfer signal.

10. The signal transmission/reception method of claim 8, wherein an activation period of the restoration signal has a duration substantially equal to an activation period of the pulse signal.

11. The signal transmission/reception method of claim 8, wherein, in the generating of the delayed transfer signal, the transfer signal is delayed by a delay value substantially equal to an activation period of the pulse signal, so that the delayed transfer signal is generated.

12. The signal transmission/reception method of claim 8, wherein the transmission line includes a through-silicon via.

13. The signal transmission/reception method of claim 8, wherein the pulse signal includes one of a command, an address and data of a semiconductor memory.

* * * * *